United States Patent [19]

Schafer et al.

[11] 4,124,556

[45] Nov. 7, 1978

[54] MOULDING COMPOSITION CONTAINING (A) SILANE ADDITIVE (B) IRON OXIDE AND (C) POLYURETHANE RESIN AND METHOD FOR PREPARING SHAPED FOUNDRY PRODUCTS

[75] Inventors: Robert J. Schafer; Richard H. Toeniskoetter, both of Worthington, Ohio

[73] Assignee: Ashland Oil, Inc., Ashland, Ky.

[21] Appl. No.: 778,292

[22] Filed: Mar. 16, 1977

[51] Int. Cl.² .......................... C08K 3/10; C08K 7/00; C08K 5/13
[52] U.S. Cl. .................. 260/29.15 B; 164/6; 164/12; 164/43; 164/97; 260/38; 260/52; 260/DIG. 40
[58] Field of Search .......... 260/29.15 B, 38, DIG. 40; 164/43

[56] References Cited

U.S. PATENT DOCUMENTS

| | | | |
|---|---|---|---|
| 3,409,579 | 11/1968 | Robins | 260/30.4 R |
| 3,432,457 | 3/1969 | Robins | 260/38 |
| 3,485,797 | 12/1969 | Robins | 260/38 |
| 3,646,999 | 3/1972 | Hamby et al. | 260/DIG. 40 |
| 3,676,392 | 7/1972 | Robins | 260/38 |
| 3,720,642 | 3/1973 | Junger et al. | 260/DIG. 40 |
| 3,734,936 | 5/1973 | Brown | 260/DIG. 40 |
| 3,878,142 | 4/1975 | Tisza | 260/38 |
| 3,878,159 | 4/1975 | Vargiu | 260/38 |
| 3,905,934 | 9/1975 | Gardikes | 260/38 |
| 3,956,227 | 5/1976 | Foley et al. | 260/38 |

*Primary Examiner*—Herbert J. Lilling
*Attorney, Agent, or Firm*—Van D. Harrison, Jr.

[57] ABSTRACT

Molding composition particularly suited for molding foundry cores and molds is obtained by mixing the components of a polyurethane resin with aggregate (sand), a silane, and iron oxide, molding the mixture to a desired shape and curing it.

15 Claims, No Drawings

MOULDING COMPOSITION CONTAINING (A) SILANE ADDITIVE (B) IRON OXIDE AND (C) POLYURETHANE RESIN AND METHOD FOR PREPARING SHAPED FOUNDRY PRODUCTS

NATURE OF THE INVENTION

This invention relates to articles made of sand bonded with synthetic resin, to processes for preparing such articles, and to the molding compositions used in these processes. More particularly, this invention relates to foundry cores and molds comprising sand particles bonded with synthetic resin.

SUMMARY OF THE INVENTION

We have discovered that incorporating iron oxide and silane compounds into combinations of aggregate with polyurethane resin components provide a greatly improved composition for molding articles such as tiles, birdbaths, ornamental statuary and foundry cores and molds. Such articles have a greatly enhanced resistance to deterioration from exposure to water and atmospheric humidity. In brief, this invention, therefore comprises a molded article whose composition comprises:
(a) an aggregate;
(b) a silane additive;
(c) iron oxide; and
(d) up to about 10% by weight of a polyurethane resin and curing agent;

In another aspect, this invention comprises the molding mixture for making the molded article of the aforedescribed composition. In still another aspect, this invention comprises the process for making molded articles using the molding composition of this invention.

DESCRIPTION OF THE INVENTION

In one aspect this invention comprises a molding composition having the following composition:
(a) an aggregate (sand) as a major constituent;
(b) a silane additive having the formula:

wherein R' is a hydrocarbon radical and R is an alkyl radical, alkoxy-substituted alkyl radical, vinyl radical, acryloxy-substituted alkyl radical, epoxy-substituted alkyl radical, glycidoxy-substituted alkyl radical, mercapto-substituted alkyl radical, ureido-substituted alkyl, alkyl amino-substituted alkyl radical, said alkyl radical having from 1 to 6 carbon atoms; or other organo-functional silane adhesion promoters;
(c) an iron oxide in an amount of between about 0.1 and about 5% by weight of aggregate, preferably in the range of about 0.25 to about 2% by weight; and
(d) up to about 10% by weight of aggregate of binder composition comprising in admixture, a polyurethane resin and a curing agent comprising a base, a tertiary amine, or a metal ion catalyst.

The polyurethane resins which can be used in the molding composition of this invention include phenolic, polyether and alkyd oil types. A preferred polyurethane is a resin binder comprising in admixture a resin component, a hardner component, and a curing agent, said resin component comprising an organic solvent solution of a non-aqueous phenolic resin which comprises a condensation product of a phenol having the general formula:

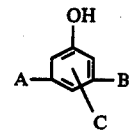

where A, B and C are hydrogen, hydrocarbon radicals, oxyhydrocarbon radicals, or halogen, with an aldehyde having the general formula R'CHO where R' is a hydrogen on a hydrocarbon radical of 1 to 8 carbon atoms; said hardener component comprising liquid polyisocyanate containing at least two isocyanate groups; and said curing agent comprising a base having a $pK_b$ value of about 7 to 11, a metal ion catalyst, or an amine.

The resin component is prepared from phenols and aldehydes in the manner described in U.S. Pat. No. 3,485,797. Preferably the resin component is a benzylic ether resin having the general formula:

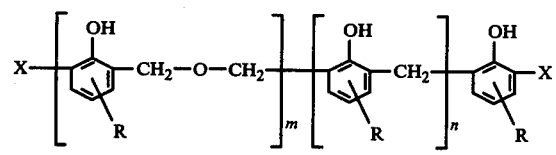

wherein R is hydrogen or a phenolic substituent meta to the hydroxyl group of the phenol, m and n are numbers the sum of which is at least 2, and the ratio of m-to-n is at least 1, and X is a hydrogen or a methylol group, the molar ratio of said methylol group-to-hydrogen being at least 1. U.S. Pat. No. 3,676,392 discloses that these benzylic ether resins can be combined with aliphatic, cycloaliphatic, or aromatic polyisocyanates, and foundry sands to make foundry cores and molds. Preferred isocyanates are the polyaromatic MDI type isocyanates, such as those sold under the tradenames "PAPI" and "Mondur MR" and mixtures thereof.

Curing is effected in several ways. It can be effected with a base, preferably having a $pK_b$ value in the range of about 7 to about 11, incorporated into the resin, as described in U.S. Pat. No. 3,676,392. Curing can be effected by the incorporation of a metal ion catalyst in the form of a metal salt as disclosed in U.S. Pat. No. 3,432,457. Curing can be effected by exposure to amines preferably tertiary amines, disclosed in U.S. Pat. No. 3,409,579. The disclosures of U.S. Pat. Nos. 3,409,579; 3,432,457; 3,485,797; and 3,676,392 are incorporated herein by reference.

The aggregate material preferably is silica sand. Other aggregate materials which can be used include zircon, chromite and alumina sands and other various natural materials of appropriate particle size distribution.

The silane utilized in this invention has the general formula:

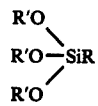

wherein R' is a hydrocarbon radical and preferably an alkyl radical of 1 to 6 carbon atoms and R is an alkyl radical, alkoxy-substituted alkyl radical, vinyl radical, acryloxy-substituted alkyl radical, epoxy-substituted alkyl radical, glycidoxy-substituted alkyl radical, mercapto-substituted alkyl radical, ureido-substituted alkyl radical, alkyl-amino-substituted alkyl radical in which the alkyl groups have from 1 to 6 carbon atoms, or it can be other organo-functional silane adhesion promoters. The aforesaid silane is employed in concentrations of about 0.0005% to about 0.1% based on weight of sand and exclusive of solvent carrier. A preferred range of silane is between about 0.01 to about 0.03% based on weight of sand.

In the molding composition of this invention, the aggregate, e.g. sand, is the major constituent and the binder portion constitutes a relatively minor amount, generally less than 10%, frequently within the range of 0.25 to about 5%, these Figures being based on the weight of the aggregate. Although the sand employed is preferably dry sand, moisture of up to about 1 weight percent based on the weight of the sand can be tolerated.

The iron oxide used in this invention can be any oxide having the desired color characteristics and of a sufficient particle size to be distributed evenly through the moulding composition mix and is used in a ratio of between 0.1 and 5 parts by weight per 100 parts of aggregate, or preferably between 0.25 and 2 parts per 100 parts of aggregate. Preferably the iron oxide is a naturally occurring tan, yellow or red pigment, such as yellow ocher or the red pigment commonly called Tamm's iron oxide, or a synthetic iron oxide such as the red oxide [$Fe_2O_3$] pigment marketed under the trade designation RO-8097 or the yellow hydrated ferric oxide [$Fe_2O_3.H_2O$] pigment, trade designation YLO 2288B both marketed by the Pfizer Chemical Company.

In the most preferred procedure for mixing the compounds of the molding mixture of this invention, the silane is first mixed with the aggregate (sand). Ordinarily the silane will be dissolved in a carrier, preferably a volatile liquid such as methanol, methylene chloride, trichloroethane. When methylene chloride or trichloroethane are used, they must be mixed with the silane just prior to mixing with the sand or precipitates may form in the solution. When the silane solution has been mixed with the sand and the major portion of the solvent has evaporated, the iron oxide pigment is added and thoroughly mixed in. Subsequently the resin binder components, for example, a phenolic resin of the benzylic ether type, and polyisocyanate of the polymeric MDI type and suitable base or metal ion catalyst, if these are used, are added and mixed. The composition is then ready for shaping and curing either by allowing the base catalyst to effect curing or by flowing an amine gas or vapor through the molded shape. This invention is particularly useful for making foundry cores and molds. In this use, the uncured sand-resin mixture is packed into molds and cured by means of either the base catalyst, metal ion catalyst, or by flowing an amine gas through the shaped mixture. In a similar manner other articles such as tiles, ornamental statuary, etc., can be manufactured.

EXAMPLE 1

This example illustrates the enhanced resistance to water of articles, particularly foundry cores, made with the molding composition of this invention. This example further illustrates two techniques for curing the molded shapes and the unexpected benefit derived from the incorporation of iron oxide into the molding composition. One hundred (100) parts of Wedron 5010 sand were first coated with 1 part of a 1% by weight solution in methanol of a silane and mixed until most of the methanol had evaporated. In Runs A, B, C and D, reported in Table I, the silane was gamma-glycidoxy-propyltrimethoxy silane. In Runs E and F, it was gamma-aminopropyltriethoxy silane. According to the manufacturer, Wedron 5010 sand is 99.88% silica, 0.2% iron oxide, 0.10% aluminum oxide, 0.015% titanium dioxide, 0.01% calcium oxide, and 0.005% magnesium oxide, and has the following size distribution: 0.4% retained on U.S. No. 40, 11.2% retained on U.S. No. 50, 35.2% retained on U.S. No. 70, 37.4% retained on U.S. No. 100, 10.8% retained on U.S. No. 140, 4.0% retained on U.S. No. 200, 0.8% retained on U.S. No. 230, 0.8% retained on U.S. No. 270, 0.2% retained on U.S. No. 325, and 66.92 Grain fineness (AFS). In Runs A, C and F, iron oxide pigment was then dispersed in the mixture in the ratio of 0.5 parts pigment to 100 parts of sand. The pigment was a mixture of four parts of a yellow iron oxide pigment, trade named "YXO 2288B", and one part of red iron oxide pigment, trade named "RO 8097", both made available by the Pfizer Chemical Company. After the iron oxide pigment was dispersed, 1.25 parts each of a commercially available atomatic polyisocyanate (designated Part II in Table I) and a benzylic ether resin, (designated Part I in Table I), corresponding to the disclosure of U.S. Pat. No. 3,485,797 and available from Ashland Chemical Company, Columbus, Ohio, were added to each of the mixtures A, B, C and D, and 1.5 parts of each in Runs D and E. The weights of Part I and Part II resin components stated, exclude the weight of solvent carrier also present. In Runs E and F, a base curing catalyst (4-phenyl propylpyridine) was also included in the combination. In Runs A through D, the corresponding mixtures were then formed into test samples by blowing into standard tensile strength core boxes supplied by the Redford International Minerals and Chemicals Company. In Runs E and F, each of the mixes was formed by hand ramming into standard (American Foundry Society) tensile strength samples. In Runs A, B, C and D, the samples were then cured by flowing diemthylethyl amine mixed with carbon dioxide through the samples. The samples in Runs C and D were then baked for 24 hours at 200° F. The cured samples were then tested for tensile strength and scratch resistance immediately after curing; after 24 hours exposure to room temperature and humidity; after an additional 24 hours exposure to 100% relative humidity at room temperature; and after 24 hours exposure to room temperature and humidity followed by 24 hours soaking in water at room temperature. Test results are reported in Table I. From these results, it is apparent that the addition of iron oxide pigment substantially increases the resistance of the samples to water. It should also be noted that baking substantially increases the resistance to disintegration by moisture. In Table I, all ratios are expressed in parts per 100 parts of sand by weight.

TABLE I

| RUN | A | B | C | D | E | F |
|---|---|---|---|---|---|---|
| Parts per 100 parts of Wedron Sand of: | | | | | | |
| Silane | .01 | .01 | .01 | .01 | .01 | .01 |
| Iron Oxide Pigment | 0.5 | none | 0.5 | none | 0.5 | none |
| Resin, Part I | 1.25 | 1.25 | 1.25 | 1.25 | 1.5 | 1.5 |
| Resin, Part II | 1.25 | 1.25 | 1.25 | 1.25 | 1.5 | 1.5 |
| Cured by: | | | dimethylethylamine | | 4-phenyl-propyl-pyridine | |
| Post baking for 24 hours at 200 F. | none | none | yes | yes | none | none |
| Tensile strength, pounds per square inch (relative scratch resistance indicated in parentheses) | | | | | | |
| Immediately after curing | 305 (80) | 292 (80) | not determined | | | |
| After 24 hours exposure to room temperature and room humidity | 453 (88) | 538 (87) | 725 (91) | 713 (92) | 650 (90) | 663 (87) |
| After 24 hours exposure to room temperature and room humidity and 24 hours to 100% relative humdity | 350 (87) | 175 (78) | 515 (88) | 438 (87) | *438 (99) | *168 (81) |
| After 24 hours exposure to room temperature and room humidity and 24 hours immersion in water | 175 (67) | 138 (66) | 508 (85) | 350 (83) | **273 (80) | **143 (72) |

*After 24 hours exposure to room temperature and room humidity and 48 hours exposure to 100% relative humidity
**After 24 hours exposure to room temperature and room humidity and 48 hours immersion in water
***Exclusive of carrier solvent

EXAMPLE 2

Molding mixtures were prepared following the ratios and procedure of Runs A, B, C and D except that the type of solvent carrier and concentration of silane were varied to determine the effect of concentration and solvent type. The solvents tested were methylene chloride (Runs G, H and I), trichloroethane (Runs J, K and L) and methanol (Run M), at silane concentrations of 2, 8 and 20 weight percents. The silane used was gamma-aminopropyltriethoxy silane. Tensile strength and scratch resistance tests were made as done in Example 1. Results are reported in Table II. From the data, it was determined that the best results were obtained with a 20% solution of silane in trichloroethane.

TABLE II

| RUN | G | H | I | J | K | L | M |
|---|---|---|---|---|---|---|---|
| Solvent | methylene chloride | | | trichloroethane | | | methanol |
| Percent concentration of Silane in Solution | 2 | 8 | 20 | 2 | 8 | 20 | 20 |
| Parts by weight of Solution used per 100 parts of sand | 1 | 0.25 | 0.1 | 1 | 0.25 | 0.1 | 0.1 |
| Tensile Strength (Scratch hardness indicated in parentheses) | | | | | | | |
| Immediate | 260 | 305 | 288 | 300 | 268 | 315 | 285 |
| After 24 hours exposure to room temperature and room humidity | 590 (93) | 590 (94) | 598 (92) | 573 (91) | 588 (91) | 608 (92) | 503 (93) |
| After 48 hours exposure to room temperature and room humidity | 623 (88) | 675 (94) | 613 (93) | 590 (91) | 600 (91) | 668 (93) | 590 (93) |
| After 24 hours exposure to room temperature and room humidity and 24 hours exposure to 100 percent relative humidity | 455 (91) | 438 (91) | 438 (90) | 428 (91) | 448 (90) | 505 (94) | 473 (90) |
| After 24 hours exposure to room temperature and 24 hours immersion in water | 325 (82) | 288 (84) | 318 (86) | 375 (83) | 325 (84) | 365 (88) | 370 (87) |
| After baking for 10 minutes at 400° F. and exposure to room temperature and humidity for 24 hours | 833 (92) | 845 (90) | 883 (91) | 803 (92) | 838 (92) | 845 (91) | 810 (92) |
| After baking for 10 minutes at 400° F. and exposure to 100% relative humidity for 24 hours | 580 (90) | 675 (91) | 563 (92) | 648 (90) | 738 (90) | 723 (90) | 695 (91) |
| After baking for 10 minutes at 400° F. and immersion in water for 24 hours | 595 (87) | 635 (93) | 600 (92) | 630 (92) | 680 (91) | 735 (93) | 623 (90) |

We claim:
1. A molding composition comprising:
 (a) an aggregate as a major constituent:
 (b) a silane additive having the formula:

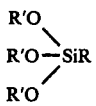

wherein R' is a hydrocarbon radical and R is an alkyl radical, an alkoxy-substituted alkyl radical, vinyl radical, acryloxy-substituted alkyl radical, epoxy-substituted alkyl radical, glycidoxy-substituted alkyl radical, mercapto-substituted alkyl radical, ureido-substituted alkyl, alkyl amino-substituted alkyl radical, said alkyl radical having from 1 to 6 carbon atoms; or other organo-functional silane adhesion promoters;

(c) iron oxide in an amount of between about 0.25 and about 5 parts by weight per 100 parts of aggregate; and (d) up to about 10 parts by weight per 100 parts of aggregate of polyurethane resin binder comprising in admixture:

(1) a resin component comprising an organic solvent solution of a non-aqueous phenolic resin which comprises a condensation product of a phenol having the general formula:

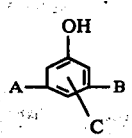

where A, B and C are hydrogen, hydrocarbon radicals, or halogen, with an aldehyde having the general formula R'CHO where R' is a hydrogen on a hydrocarbon radical of 1 to 8 carbon atoms; a hardener component comprising liquid polyisocyanate containing at least two isocyanate groups; and a curing agent comprising a base.

2. The molding composition of claim 1 wherein the aldehyde is formaldehyde.

3. The molding composition of claim 1 wherein the aldehyde is formaldehyde, and A and B are hydrogen and C is a hydrocarbon radical.

4. The molding composition of claim 1 wherein the aldehyde is formaldehyde and A, B and C are hydrogen.

5. The molding composition of claim 1 wherein the phenolic resin has the general formula:

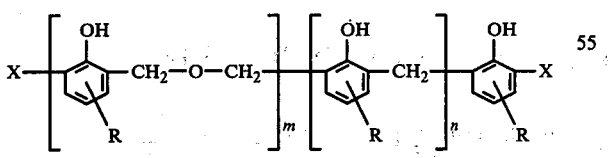

wherein R is hydrogen or a phenolic substituent meta to the hydroxyl group of the phenol, m and n are numbers the sum of which is at least 2, and the ratio of m-to-n is at least 1, and X is a hydrogen or a methylol group, the molar ratio of said methylol group-to-hydrogen being at least 1.

6. The molding composition of claim 5 wherein R is hydrogen.

7. The molding composition of claim 5 wherein the polyisocyanate is an aromatc polyisocyanate.

8. The molding composition of claim 5 wherein the polyisocyanate is a polymeric MDI type polyisocyanate.

9. The molding composition of claim 1 wherein said iron oxide is an iron oxide pigment selected from the group consisting of natural or synthetic red iron oxide, tan iron oxide, hydrated yellow iron oxide, and mixtures of two or more thereof.

10. The molding composition of claim 1 wherein said iron oxide is a mixture of red iron oxide and yellow iron oxide.

11. A process for molding articles comprising:
(a) mixing the silane, and the aggregate of claim 1;
(b) subsequently mixing the iron oxide;
(c) subsequently mixing in the urethane resin binder components;

12. A molded article comprising:
(a) aggregate;
(b) up to about 10 parts by weight per 100 parts of aggregate of the binder composition of claim 1;
(c) the silane additive of claim 1 in an amount of between about 0.0005 and about 0.1 parts by weight per 100 parts of aggregate; and
(d) iron oxide in an amount of between about 0.25 and about 2 parts by weight per 100 parts of aggregate.

13. The molded article of claim 12 wherein said iron oxide is a pigment selected from the group consisting of natural or synthetic red iron oxide, tan iron oxide, hydrated yellow iron oxide, and mixtures of two or more thereof.

14. The molded article of claim 12 wherein said iron oxide pigment is a mixture of red iron oxide and hydrated yellow iron oxide.

15. A process for preparing shaped foundry products comprising:
(a) mixing an aggregate as a major constituent and a silane having the formula:

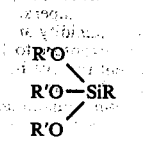

wherein R' is a hydrocarbon radical and R is an alkyl radical, an alkoxy-substituted alkyl radical, vinyl radical, acryloxy-substituted alkyl radical, epoxy-substituted alkyl radical, glycidoxy-substituted alkyl radical, mercapto-substituted alkyl radical, ureido-substituted alkyl radical, alkyl amino-substituted alkyl radical, said alkyl radical having from 1 to 6 carbon atoms; or other organo-functional silane adhesion promoters;

(b) subsequently mixing in iron oxide in an amount of between about 0.1 and about 2 parts by weight per 100 parts of aggregate;

(c) subsequently mixing in a binder comprising:
(1) a resin component comprising an organic solvent solution of a non-aqueous phenolic resin which comprises a condensation product of a phenol having the general formula:

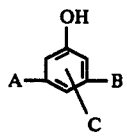

where A, B and C are hydrogen, hydrocarbon radicals, or halogen, with an aldehyde having the general formula R'CHO where R' is a hydrogen on a hydrocarbon radical or 1 or 8 carbon atoms;
(2) a hardener component comprising liquid polyisocyanate containing at least two isocyanate groups; and
(3) a curing agent comprising a base;
(d) molding the resultant mixture to a desired shape; and
(e) curing the shaped mixture.

* * * * *

UNITED STATES PATENT AND TRADEMARK OFFICE
CERTIFICATE OF CORRECTION

PATENT NO. : 4,124,556
DATED : November 7, 1978
INVENTOR(S) : Robert J. Schafer and Richard H. Toeniskoetter It is certified that error appears in the above-identified patent and that said Letters Patent are hereby corrected as shown below:

In column 7, line 17 delete "5" and substitute therefor --2-- so that line 17 reads "about 2 parts by weight per 100 parts of aggregate;"

Signed and Sealed this

Twenty-fifth Day of September 1979

[SEAL]

Attest:

LUTRELLE F. PARKER
Attesting Officer  Acting Commissioner of Patents and Trademarks